(12) United States Patent
Chilton

(10) Patent No.: US 11,248,533 B2
(45) Date of Patent: Feb. 15, 2022

(54) GAS TURBINE ENGINE

(71) Applicant: ROLLS-ROYCE plc, London (GB)

(72) Inventor: Nicholas E Chilton, Derby (GB)

(73) Assignee: ROLLS-ROYCE PLC, London (GB)

( * ) Notice: Subject to any disclaimer, the term of this patent is extended or adjusted under 35 U.S.C. 154(b) by 31 days.

(21) Appl. No.: 16/866,845

(22) Filed: May 5, 2020

(65) Prior Publication Data

US 2020/0370479 A1  Nov. 26, 2020

(30) Foreign Application Priority Data

May 20, 2019 (GB) .................................. 1907074

(51) Int. Cl.
| | | |
|---|---|---|
| *F02C 7/36* | (2006.01) | |
| *F02K 3/06* | (2006.01) | |
| *F02K 3/072* | (2006.01) | |

(52) U.S. Cl.
CPC ............. *F02C 7/36* (2013.01); *F02K 3/06* (2013.01); *F02K 3/072* (2013.01);
(Continued)

(58) Field of Classification Search
CPC .......... F01D 9/065; F01D 25/18; F01D 25/20; F01M 1/00; F01M 1/02; F02C 7/06;
(Continued)

(56) References Cited

U.S. PATENT DOCUMENTS

| | | | |
|---|---|---|---|
| 2,474,258 A * | 6/1949 | Kroon .................... | F02C 7/047 415/175 |
| 4,972,671 A | 11/1990 | Asselin et al. | |
| 5,107,676 A | 4/1992 | Hadaway et al. | |

(Continued)

FOREIGN PATENT DOCUMENTS

| | | |
|---|---|---|
| EP | 3 112 627 A1 | 1/2017 |
| EP | 3 351 829 A1 | 7/2018 |

(Continued)

OTHER PUBLICATIONS

Combined Search and Examination Report of the Intellectual Property Office of the United Kingdom for GB1907074.7 with report dated Nov. 5, 2019 and search date of Nov. 4, 2019.

(Continued)

*Primary Examiner* — Woody A Lee, Jr.
*Assistant Examiner* — Elton K Wong
(74) *Attorney, Agent, or Firm* — Oliff PLC

(57) ABSTRACT

A gas turbine engine for an aircraft. The gas turbine engine for an aircraft comprising: an engine core comprising an annular gas passage, a turbine, a compressor, and a core shaft connecting the turbine to the compressor; a fan located upstream of the engine core, the fan comprising a plurality of fan blades; and a power gearbox that receives an input from the core shaft and outputs drive to the fan so as to drive the fan at a lower rotational speed than the core shaft. The engine further has a recirculatory lubricant system which feeds lubricant to and scavenges lubricant from the power gearbox. The engine further has a circumferential row of inlet guide vanes, located downstream of the fan at an air inlet of the annular gas passage. The recirculatory lubricant system includes one or more return passages for lubricant scavenged from the power gearbox, the return passages crossing the annular gas passage through one or more of the inlet guide vanes.

9 Claims, 6 Drawing Sheets

(52) U.S. Cl.
CPC .... *F05D 2220/323* (2013.01); *F05D 2240/12* (2013.01); *F05D 2240/35* (2013.01); *F05D 2240/50* (2013.01); *F05D 2260/40311* (2013.01); *F05D 2260/98* (2013.01)

(58) Field of Classification Search
CPC .... F02C 7/14; F02C 7/36; F05D 2260/40311; F05D 2260/98; F05D 2220/323; F05D 2240/12; F05D 2240/35; F05D 2240/50; F02K 3/06; F02K 3/072
See application file for complete search history.

(56) References Cited

U.S. PATENT DOCUMENTS

| | | | |
|---|---|---|---|
| 8,985,277 B2 | 3/2015 | Hetherington et al. | |
| 2008/0236951 A1* | 10/2008 | Alecu | F01D 25/18 184/6.11 |
| 2013/0319006 A1* | 12/2013 | Parnin | F01D 25/18 60/805 |
| 2014/0182972 A1* | 7/2014 | Hetherington | F01D 25/18 184/6.11 |
| 2017/0122206 A1* | 5/2017 | Niergarth | F02C 7/14 |
| 2017/0152859 A1 | 6/2017 | Miller et al. | |

FOREIGN PATENT DOCUMENTS

| | | |
|---|---|---|
| GB | 2234035 A | 1/1991 |
| WO | 2014/022150 A1 | 2/2014 |
| WO | 2015/126500 A1 | 8/2015 |

OTHER PUBLICATIONS

Aug. 3, 2020 extended Search Report issued in European Patent Application No. 20170314.7.

\* cited by examiner

GAS TURBINE ENGINE

CROSS-REFERENCE TO RELATED APPLICATIONS

This application claims the benefit of United Kingdom Patent Application GB 1907074.7 filed on May 20, 2019, the disclosure of which is herein incorporated by reference in its entirety.

TECHNICAL FIELD

The present disclosure relates to a gas turbine engine, and particularly to a gas turbine engine having a recirculatory lubricant system which feeds lubricant to and scavenges lubricant from a power gearbox.

BACKGROUND OF THE DISCLOSURE

The present disclosure provides a gas turbine engine and an aircraft as set out in the appended claims.

Most gas turbine engines utilise rolling element type bearings to locate rotors within the general structure of the gas turbine engine. Particularly in large civil aircraft engines, positive lubrication for such bearings during in-flight windmill may be unavailable. This is due to the engine oil system pump being driven by the high-pressure spool of the engine, and during in-flight windmill the high-pressure spool speed being below the level than can guarantee oil feed to the bearings. However, rolling element type bearings, in this application, have been found to survive engine shutdown in-flight, and the subsequent windmilling of the engine without any positive (i.e. active) lubrication.

However, this is not true of other bearings types. For example, journal bearings require a consistent supply of lubricant to them in both normal and windmilling conditions. Without this supply, the journal bearing will likely be damaged and may even seize.

Journal bearings may be found in a power gearbox of a gas turbine engine for an aircraft, the power gearbox transferring drive from the connecting shaft of, typically, the low-pressure spool of the engine to a propulsive fan of the engine. There is thus a need to configure the lubricant system of the engine such that lubricant is always provided to the power gearbox and particularly to the journal bearings.

BRIEF SUMMARY OF THE DISCLOSURE

According to a first aspect there is provided a gas turbine engine for an aircraft comprising:
an engine core comprising an annular gas passage, a turbine, a compressor, and a core shaft connecting the turbine to the compressor;
a fan located upstream of the engine core, the fan comprising a plurality of fan blades; and
a power gearbox that receives an input from the core shaft and outputs drive to the fan so as to drive the fan at a lower rotational speed than the core shaft;
wherein:
the engine further has a recirculatory lubricant system which feeds lubricant to and scavenges lubricant from the power gearbox;
the engine further has a circumferential row of inlet guide vanes, located downstream of the fan at an air inlet of the annular core gas passage;
the recirculatory lubricant system includes one or more return passages for lubricant scavenged from the power gearbox, the return passages crossing the annular gas passage through one or more of the inlet guide vanes; and
the recirculatory lubricant system includes a primary circuit which feeds lubricant to the journal bearings and gears of the power gearbox, and a secondary circuit which only feeds lubricant to the journal bearings of the power gearbox.

Advantageously, passing the return passages for the lubricant (e.g. oil) scavenged from the power gearbox through the inlet guide vanes facilitates the introduction of features at this location which can divert lubricant to, for example journal bearings of the power gearbox in preference to the gears of the power gearbox, and thereby ensure adequate supply of lubricant to the journal bearings, e.g. during in-flight windmill.

The recirculatory lubricant system includes a primary circuit which feeds lubricant to the journal bearings and gears of the power gearbox (and optionally the shaft bearings of the aforementioned drive shaft), and a secondary circuit which only feeds lubricant to the journal bearings of the power gearbox. The recirculatory lubricant system can then prioritise the flow of lubricant to the secondary circuit over the flow of lubricant to the primary circuit e.g. during in-flight windmill.

According to a second aspect, there is provided an aircraft, including one or more gas turbine engines of the first aspect.

Optional features of the present disclosure will now be set out. These are applicable singly or in any combination with any aspect of the present disclosure.

The power gearbox may output drive to the fan via a drive shaft, which is located in the engine by respective shaft bearings. In this case, the recirculatory lubricant system can also feed lubricant to and scavenge lubricant from the shaft bearings.

Typically, the power gearbox includes one or more journal bearings and gears which are lubricated by the recirculatory lubricant system.

The engine may have plural of the return passages which cross the annular gas passage through the one or more of the inlet guide vanes.

Thus, when the recirculatory lubricant system includes the primary circuit and the separate secondary circuit, one or more of the return passages may be first return passages which return lubricant to the primary circuit, and one or more of the return passages may be second return passages which return lubricant to the secondary circuit.

In this case, the engine may further comprise a lubricant run at the radially inner end of the inlet guide vanes which is configured to receive the lubricant scavenged from the power gearbox (and optionally the shaft bearings) and guide the received lubricant into the return passages. This lubricant run can, conveniently, be used to divert lubricant to the power gearbox journal bearings in preference to other components of the power gearbox (and the shaft bearings). In particular, the lubricant run may be further configured such that the second return passages preferentially receive lubricant over the first return passages.

For example, respective outlets to the second return passages may be at or adjacent the bottom dead centre position of the lubricant run, and respective outlets to the first return passages may be further from the bottom dead centre position. In this way lubricant can be preferentially fed to the second return passages e.g. when the lubricant run is purely gravity driven. As another example, the lubricant run may include a scoop configured to direct lubricant in the lubricant run towards a predetermined circumferential position in the lubricant run. In this case, respective outlets to the second return passages may be at or adjacent the predetermined circumferential position of the run, and respective outlets to the first return passages may be further from the predetermined circumferential position.

Additionally or alternatively, the lubricant run may include walling which surrounds respective outlets from the lubricant run to the one or more first return passages, the walling projecting in a radially inwards direction into the lubricant run such that lubricant can only enter the first return passages when the level of lubricant in the lubricant run exceeds the projecting height of the walling. In this way flow of lubricant into the second return passages can be prioritised over flow into the first return passages, e.g. because the level of lubricant in the lubricant run needed for flow into the second return passages is below the projecting height of the walling. Typically, therefore, the second return passages are without corresponding projecting walling.

One option is for the walling to be provided as respective and separate surrounding walls to the outlets to the first return passages. However, another option is for the walling to be provided as a tray which extends over the outlets to the first return passages, the outlets to the first return passages being formed in the base of the tray.

The lubricant run may further include a cover structure located above the outlets to the first return passages. The cover structure can prevent lubricant intended for the second return passages from falling under gravity into the first return passages. For example, when the walling is provided as respective and separate surrounding walls, each surrounding wall may have a respective cover located there above. As another example, when the walling is provided as a tray, a single cover may be located above the tray. The cover may direct lubricant that falls on top of the cover around the surrounding walls, so that the lubricant enters the second return passages.

The turbine may be a first turbine, the compressor may be a first compressor, and the core shaft may be a first core shaft;

and the engine may further comprise a second turbine, a second compressor, and a second core shaft connecting the second turbine to the second compressor; and the second turbine, second compressor, and second core shaft may be arranged to rotate at a higher rotational speed than the first core shaft.

The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE SEVERAL VIEWS OF THE DRAWING

Embodiments will now be described by way of example only, with reference to the Figures, in which.

DETAILED DESCRIPTION OF THE DISCLOSURE

Figure 1:
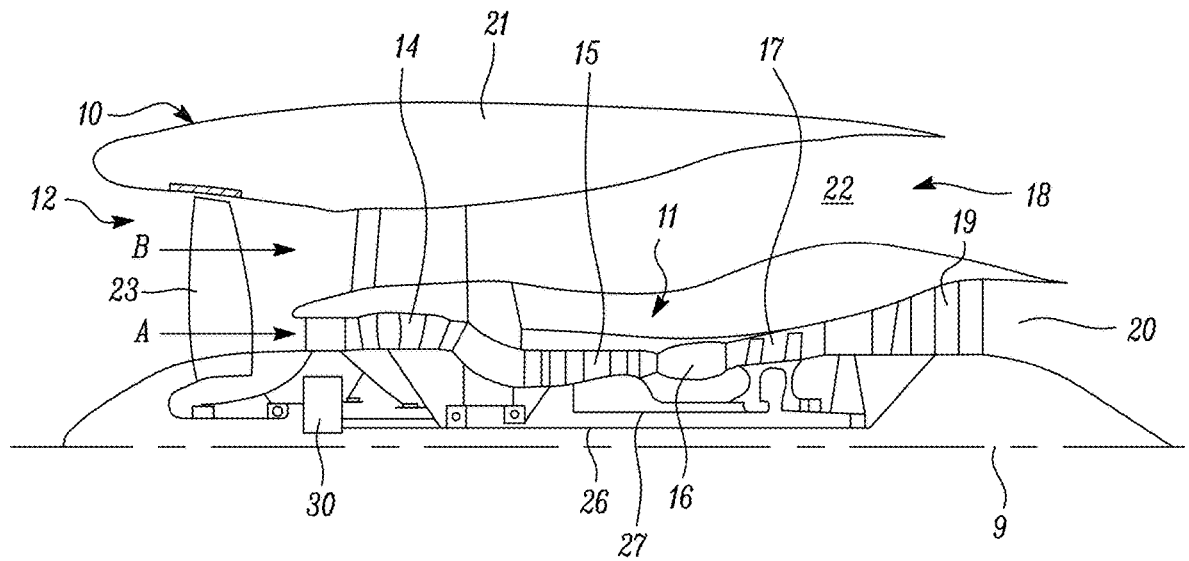
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A into an annular gas passage. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26, also referred to as a core shaft, and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
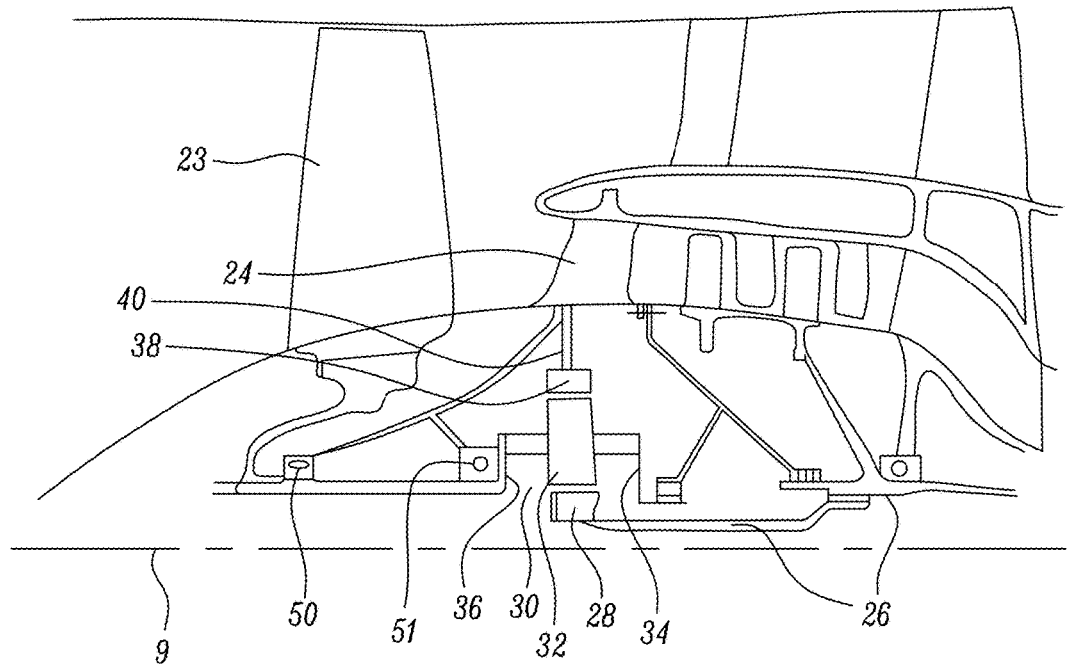
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via drive shaft 36 to the fan 23 in order to drive its rotation about the engine axis 9. Radially outwardly of the planet gears 32 and intermeshing therewith is an annulus or ring gear 38 that is coupled, via linkages 40, to a stationary supporting structure formed by a circumferential row of inlet guide vanes 24 at the entrance to the annular gas passage of the engine core 11.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
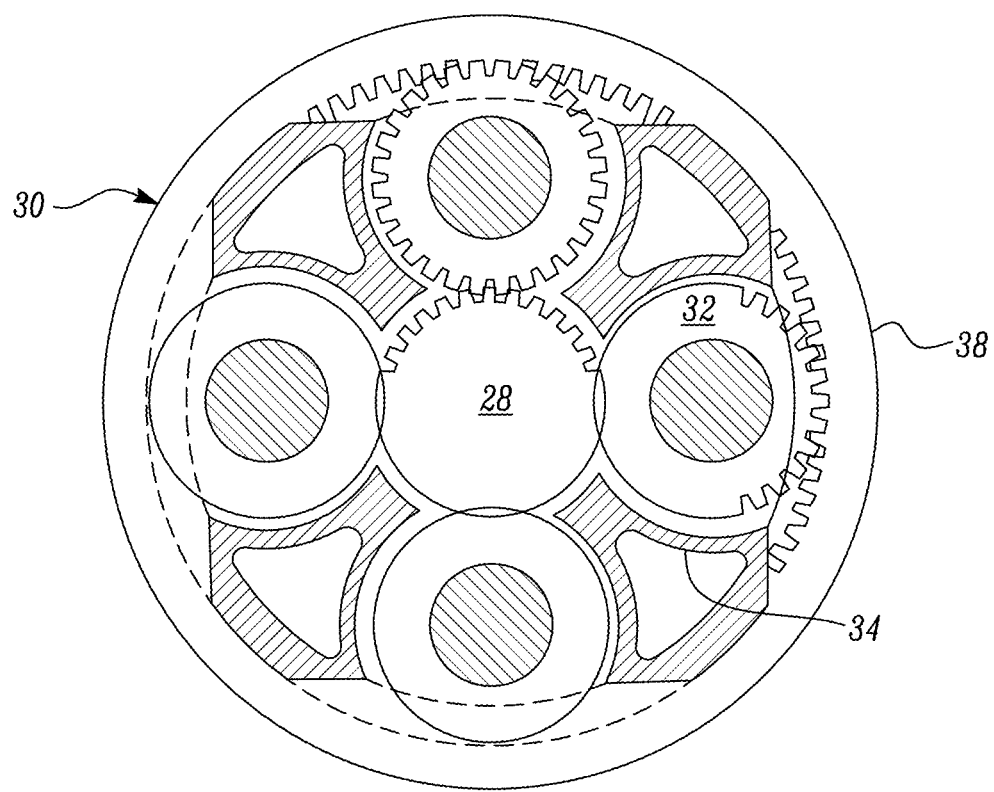
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via drive shaft 36, with the ring gear 38 fixed. However, any other suitable type of epicyclic gearbox 30 may be used. The planet gears 32 are typically mounted to the planet carrier 34 by respective journal bearings so that they rotate about their axes relative to the carrier as the carrier drives the drive shaft 36. These bearings are provided with oil via oil system 400 discussed below. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the drive shaft 36, or linkage 40 in the FIG. 2 example) between the gearbox 30 and other parts of the engine 10 (such as the input shaft 26, the output shaft and the inlet guide vanes 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

As can more readily be seen in FIG. 2, but which can also be seen in FIG. 1, drive shaft 36 is located in the engine by roller bearings 50 and ball bearings 51. These bearings are also provided with oil via oil system 400 discussed below.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
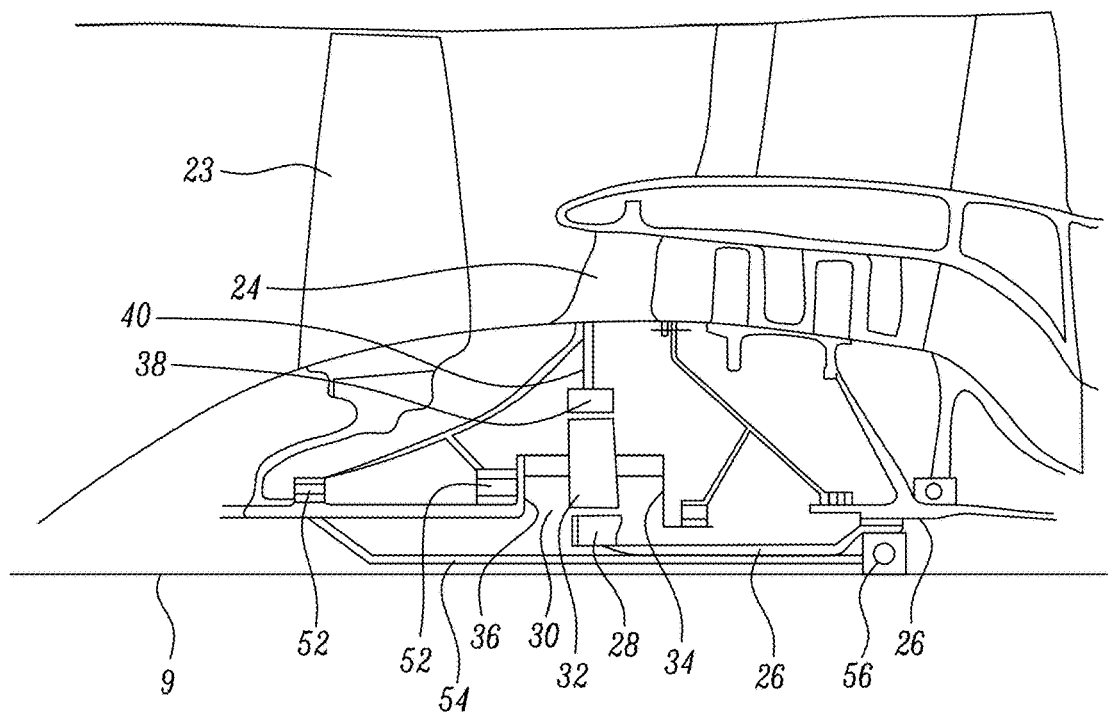
FIG. 4 is a close up sectional side view of an upstream portion of a variant gas turbine engine.

FIG. 4 shows a close up sectional side view of an upstream portion of a variant geared fan gas turbine engine 10. In contrast to the arrangement shown in FIG. 2, the drive shaft 36 from the output of the epicyclic gear arrangement 30 is radially located at both ends by two sets of roller bearings 52. These allow the shaft to transmit torque to the fan 23, but do not provide significant axial retention functionality. To axially retain the output shaft 36 and the fan 23, a separate thrust shaft 54 extends from a set of ball bearings 56 attached to the interconnecting shaft 26, through the centre of the sun gear 28 to join to the drive shaft 36. Thus, torque transmission and axial retention responsibilities are split between the drive shaft 36 and the thrust shaft 54.

Figure 5:
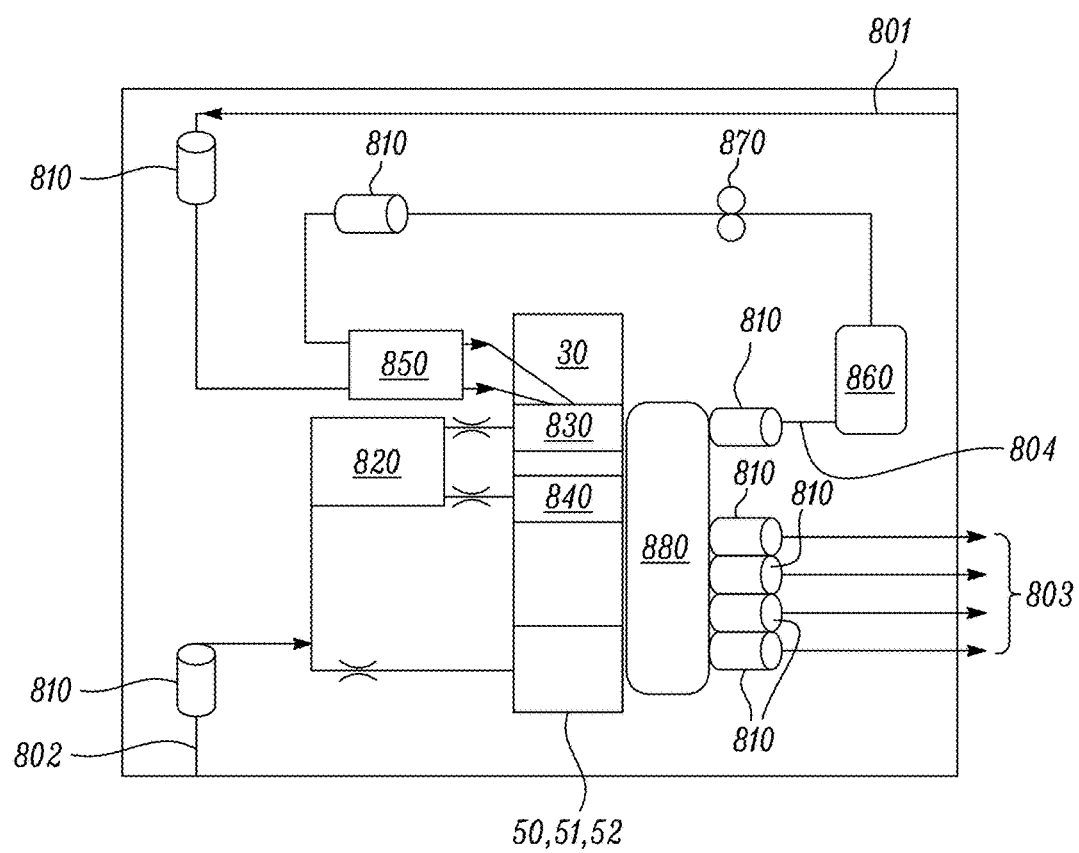
FIG. 5 is a partial oil system schematic for a gas turbine engine.

A lubricant system of the gas turbine engine 10 provides lubricating, cooling and corrosion protection for gears, bearings and shaft couplings. A part of this system, shown schematically in FIG. 5, includes a primary circuit and a secondary circuit. The primary circuit may provide oil to the bearings (e.g. bearings 50, 51, and/or 52) of the drive shaft 36 and all elements of the power gearbox 30 (e.g. journal bearings and gears), whereas the secondary circuit may provide oil to just the journal bearings of the power gearbox. During in-flight windmill, when the high-pressure spool speed may be below the level than can guarantee oil feed to all the bearings of the engine, the secondary circuit can help to prioritise the flow of lubricant to the power gearbox journal bearings.

Oil feeds 801 and 802 of the primary circuit provide oil sourced from a central oil tank (not shown) through engine section stators (ESSs) 810 to a number of elements such as: oil transfer unit 820, which provides oil to the journal bearings 830 and gears 840 of the power gearbox 30; jet and trough 850, which is a second feed to the journal bearings of the power gearbox 30; and the bearings 50, 51, 52 for the drive shaft 36.

Once the oil has passed through these elements it is scavenged into a sump 880, which contains an oil run which splits the scavenged oil flow as discussed in more detail below, and passes it through first 803 and second 804 return passages formed in ESSs 810 (selected of the inlet guide vanes 24—also discussed in more detail below). More particularly, a portion of the oil passes through first return passages 803, for filtering, deaeration and storage in the central oil tank. Another portion of the oil passes into second return passage 804, which supplies an auxiliary oil tank 860. This auxiliary oil tank is connected to an electrically driven auxiliary oil pump 870, and provides the oil feed of the secondary circuit to the journal bearings of the power gearbox 30.

Figure 6:
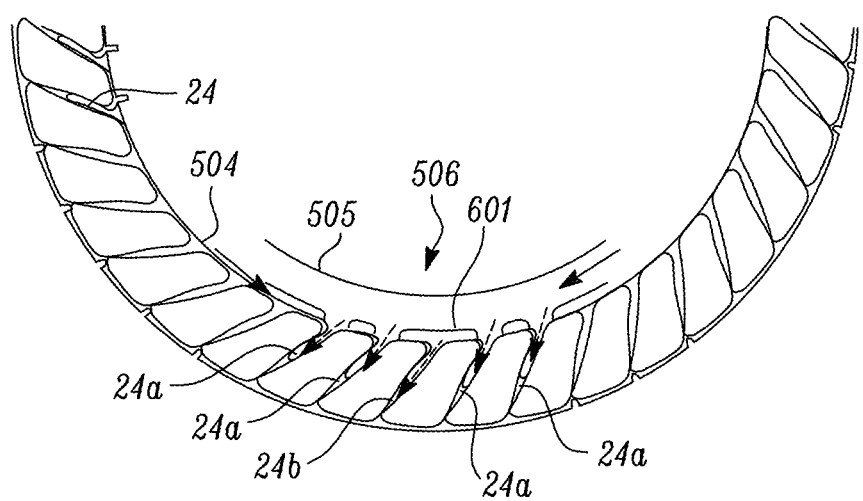
FIG. 6 is a partial cross-sectional of a plurality of inlet guide vanes.

FIG. 6 shows a transverse cross-section through the bottom half of the row of inlet guide vanes 24, a central region of which provides the sump 880 discussed above. A circumferential oil run 506, provided at the radially inner end of the inlet guide vanes, collects oil which has been provided to the power gearbox 30 and the drive shaft bearings, 50, 51, 52 by their respective circuits. Adjacent to the radially inner annular endwall of the inlet guide vanes is an outer oil run surface 504 of the oil run 506. Opposing this, and radially spaced therefrom, is an inner oil run surface 505 of the oil run 506. These surfaces extend only partially around the circumference, although the greater the circumferential extent of these surfaces, the larger the attitude angle over which the oil run will function. Collected oil enters the space between the inner and outer oil run surfaces, as shown by the solid black arrows in FIG. 6, and pools through gravity towards the bottom of the run.

A number of the inlet guide vanes 24a located towards the bottom of the run provide the first return passages 803 for the oil from the run 506. In particular, the collected oil flows (indicated by dashed lines) through a hollow volume of each inlet guide vane 24a, so as to be scavenged into the primary circuit.

Distinct from these vanes, the inlet guide vane 24b located at the bottom dead centre of the run provides the second return passage 804 for the oil from the run 506. In this case, the oil flows through the hollow volume of the vane 24b so as to be scavenged into the secondary circuit.

The oil run 506 further has walling, in the form of a tray 601, which, during in-flight windmill when the high-pressure spool speed may be below the level than can guarantee oil feed to all the bearings, can help to prioritise the flow of lubricant to the secondary circuit. The tray is illustrated in more detail in FIG. 7, which shows a partially cut-away perspective view of the inlet guide vanes and oil run 506 of FIG. 6. In particular, the tray 601 is positioned on the outer oil run surface 504 so that a bed of the tray is radially inwardly of the outer oil run surface, with a gap therebetween. The tray provides, for each of the inlet guide vanes 24a, a wall which surrounds the outlet from the oil run into the inlet guide vane 24a, and connects to the bed of the tray 601 at a respective aperture 602. Moreover, a lip 606 surrounds the edge of the tray bed. As a result, the tray acts as a funnel into the first return passage 803 of each inlet guide vane 24a, whereby it is only when the level of oil in the oil run exceeds the height of the lip 606 that lubricant can exit the oil run into first return passages 803 through apertures 602. The height of the lip 606 can be set so that oil is fully supplied to both the primary and secondary circuits during normal operation of the engine.

In contrast, oil can flow along the gap between the bed of the tray 601 and the outer oil run surface 504 and into the second return passage 804 provided by inlet guide vane 24b without hindrance. Therefore, in use, oil preferentially flows through the second return passage 804 of the inlet guide vane 24b. It is only when the oil backs up, and flows over the lip 606 of tray 601 that the first return passages 03 are provided with oil.

As discussed previously, this can allow oil to be preferentially received by the secondary circuit over the primary circuit. Whilst a tray is used in this example, in other examples the tray is not present, and oil is preferentially received in the second return passage 804 of the inlet guide vane 24b by other means.

For example, one option (not illustrated) is to remove all forms of walling at outlets from the lubricant run 506, and merely rely instead on the lower position of the inlet guide vane 24b. The amount by which the flow of lubricant to the secondary circuit is prioritised can then be amplified by e.g. increasing the number of inlet guide vanes 24b which are at or adjacent the bottom dead centre position (thereby providing more second return passages 804), and/or by increasing the spacing of the inlet guide vanes 24a (providing the first return passages 803) from the bottom dead centre position of the run so that the curve of the oil run 506 naturally requires the oil to back up further before it can enter the first return passages 803 of the inlet guide vanes 24a.

Figure 7:
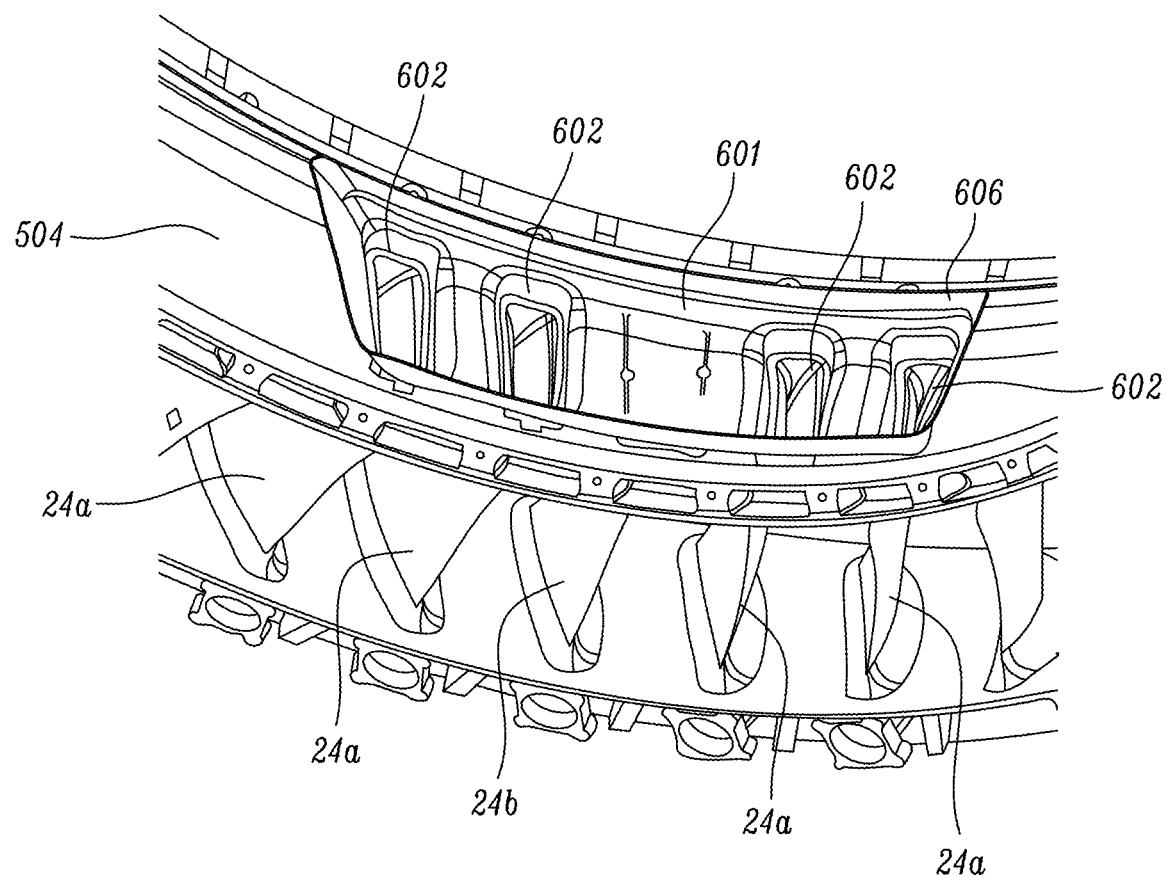
FIG. 7 is a partially cut-away perspective view of a plurality of inlet guide vanes.
Figure 8:
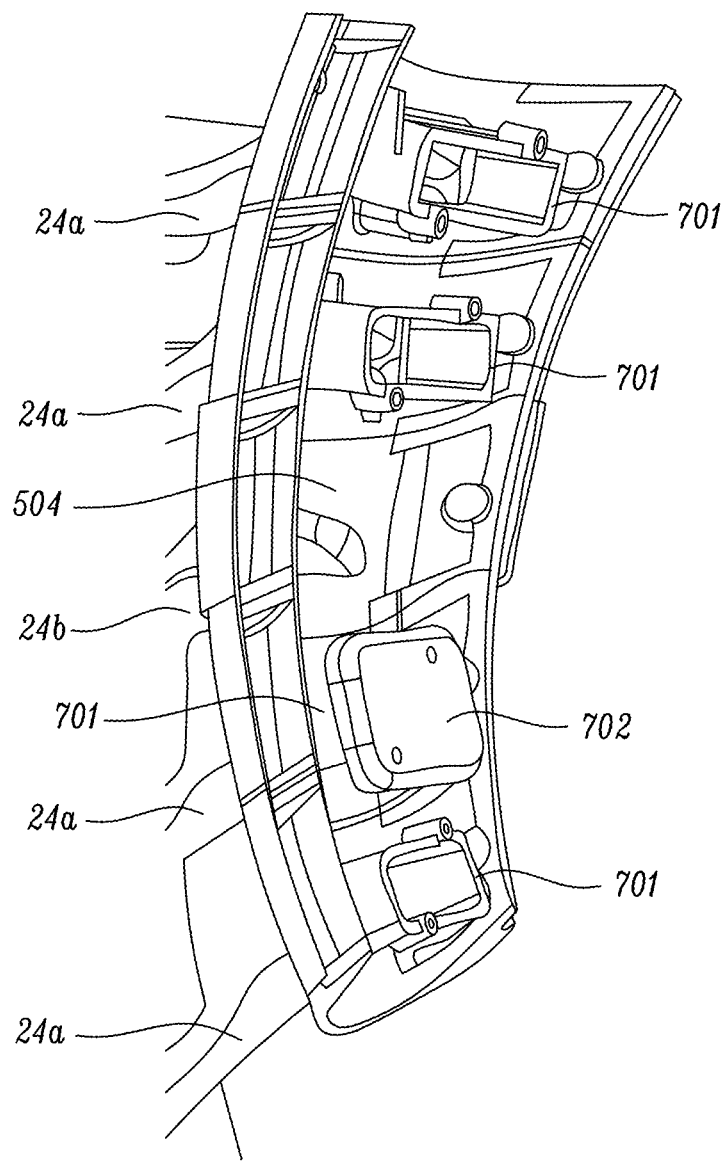
FIG. 8 is a partially cut-away perspective view of a plurality of inlet guide vanes.

FIG. 8 shows a partially cut-away perspective view of a plurality of inlet guide vanes according to another option. Some features are shared with the arrangement shown in FIGS. 6 and 7, and such features are indicated by like reference numerals.

In the example of FIG. 8, the lubricant run is configured so that each of the inlet guide vanes 24a, providing the first return passages 803 for the primary circuit, has a respective and separate surrounding wall 701 which projects radially inwardly from the outer oil run surface 504. As a result, oil cannot be scavenged into the primary circuit via a first return passage 803 until the oil level has risen to the height of the respective wall. In contrast, there is no such wall around the outlet to the second return passage 804 of the inlet guide vane 24b, and thus oil is preferentially scavenged into the secondary circuit via the second return passage 804.

In a further enhancement, the outlets to the first return passages 803 of the inlet guide vanes 24a have respective covers 702 (only one such cover shown in FIG. 8). These sit over the respective outlets, leaving a gap between each cover 702 and the corresponding surrounding wall 701, so that oil can flow therebetween. The covers help to prevent oil dripping into the first return passages 803 from the inner oil run surface. In the example of FIGS. 6 and 7, a single cover or roof could be extended over the tray 601 to similar effect.

The examples discussed above utilise gravity-dominated sumps. That is to say, oil flows due to gravity along the oil run and collects at a lowest point thereof i.e. at bottom dead centre above the inlet guide vane 24b providing the second return passage 804 for the secondary circuit. However, in other examples, the oil run can be a dynamic sump in which the collected oil has tangential momentum. In these examples, the chamber may include a scoop or similar feature which directs the oil towards the inlet guide vane(s)

which provide the second return passage(s) 804 and/or these inlet guide vanes may not be located at or adjacent the bottom dead position.

In a further example, the inlet guide vanes for the secondary circuit may be positioned off dead-centre (e.g. laterally adjacent to or laterally adjacent but one from bottom dead centre). The vane at bottom dead centre may instead comprise part of the primary circuit. The vane(s) of the primary circuit may comprise walls that exclude oil from all or the majority of the volume at bottom dead centre and may extend to a height at least comparable with the lowest point of entry for lubricant to the vane(s) of the secondary circuit. This way, oil may be preferentially directed into the secondary circuit even if the secondary circuit vane is not at bottom dead centre.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
   an engine core comprising an annular gas passage, a turbine, a compressor, and a core shaft connecting the turbine to the compressor;
   a fan located upstream of the engine core, the fan comprising a plurality of fan blades; and
   a power gearbox that receives an input from the core shaft and outputs drive to the fan so as to drive the fan at a lower rotational speed than the core shaft, wherein: the engine further has a recirculatory lubricant system which feeds lubricant to and scavenges lubricant from the power gearbox;
   wherein:
   the engine further has a circumferential row of inlet guide vanes, located downstream of the fan at an air inlet of the annular gas passage,
   the recirculatory lubricant system includes plural return passages for lubricant scavenged from the power gearbox, the return passages crossing the annular gas passage through one or more of the inlet guide vanes,
   the recirculatory lubricant system includes a primary circuit which feeds lubricant to journal bearings and gears of the power gearbox, and a secondary circuit which only feeds lubricant to the journal bearings of the power gearbox,
   one or more of the return passages are first return passages which return lubricant to the primary circuit, and one or more of the return passages are second return passages which return lubricant to the secondary circuit,
   the engine further comprises a lubricant run at the radially inner end of the inlet guide vanes which is configured to receive lubricant scavenged from the power gearbox and guide the received lubricant into the return passages, and
   the lubricant run is further configured such that the second return passages preferentially receive lubricant over the first return passages, due to the lubricant run including walling which surrounds respective outlets from the lubricant run to the first return passages, the walling projecting in a radially inwards direction into the lubricant run such that the lubricant can only enter the first return passages when a level of lubricant in the lubricant run exceeds a projecting height of the walling.

2. The gas turbine engine of claim 1, wherein the power gearbox outputs drive to the fan via a drive shaft, which is located in the engine by respective shaft bearings, the recirculatory lubricant system also feeding lubricant to and scavenging lubricant from the shaft bearings.

3. The gas turbine engine of claim 1, wherein respective outlets to the second return passages are at or adjacent a bottom dead centre position of the lubricant run, and respective outlets to the first return passages are further from the bottom dead centre position.

4. The gas turbine engine of claim 1, wherein the lubricant run includes a scoop configured to direct lubricant in the lubricant run towards a predetermined circumferential position in the lubricant run.

5. The gas turbine engine of claim 1, wherein the walling is provided as respective and separate surrounding walls to the outlets to the first return passages.

6. The gas turbine engine of claim 1, wherein the walling is provided as a tray which extends over the outlets to the first return passages, the outlets to the first return passages being formed in the base of the tray.

7. The gas turbine engine of claim 1, wherein the lubricant run further includes a cover structure located above the outlets to the first return passages.

8. The gas turbine engine according to claim 1, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

9. An aircraft, including one or more gas turbine engines as set out in claim 1.

* * * * *